Figure 2:
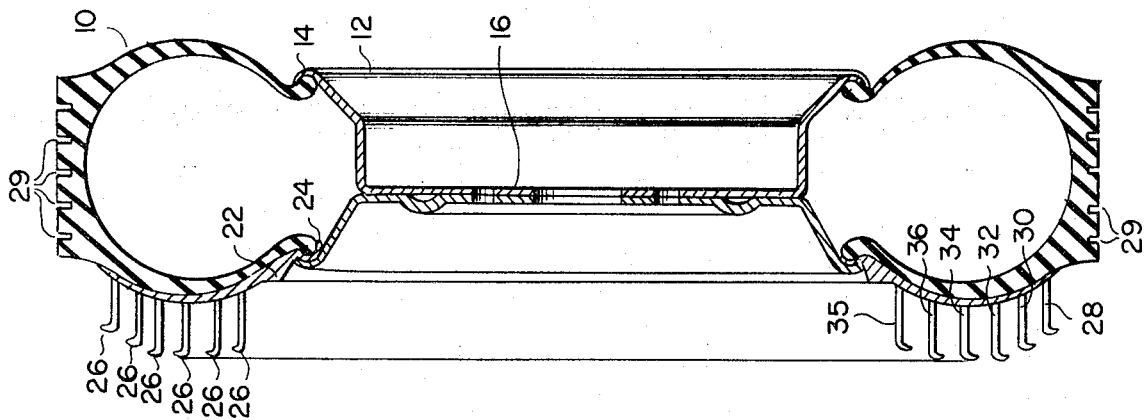

United States Patent [19]
Clark

[11] 3,863,949
[45] Feb. 4, 1975

[54] TIRE SPLASH GUARD
[76] Inventor: Lloyd Clarke, Block 20-G, Greenhill Dr., Silverhill, CH. CH., Barbados, British W. Indies
[22] Filed: May 6, 1974
[21] Appl. No.: 467,072

[52] U.S. Cl. ................................ 280/156, 152/154
[51] Int. Cl. .......................................... B62d 25/16
[58] Field of Search ..................... 280/156; 152/154

[56] References Cited
UNITED STATES PATENTS
1,867,518  7/1932  MacLean ........................... 280/156
1,905,674  4/1933  Babbs ................................ 280/156
3,187,797  6/1965  Fletcher ............................ 152/154

*Primary Examiner*—Robert R. Song

[57] ABSTRACT

This disclosure is directed to an anti-splash hub cap for intercepting water and mud splashed by the tires of motor vehicles. The cap fits on the tire and has a plurality of circumferential spaced rows of plastic interceptor rods of different lengths with downturned tips directed toward the road level. As the wheel rotates the rods create a shield effect neutralizing the spray.

6 Claims, 2 Drawing Figures

PATENTED FEB 4 1975

3,863,949

TIRE SPLASH GUARD

BACKGROUND OF THE INVENTION

1. Field of the Invention

This invention relates to an anti-splash attachment for motor vehicle tires for directing mud or spray up into the mudguard instead of laterally.

The attachment has a shape which conforms to that of the tire and its inner periphery fits on the tire rim with the tire or is glued thereto. A plurality of rows of flexible plastic rods extend from the attachment with the tips directed toward the road surface.

2. State of the Art

The art to which this invention relates already is aware of U.S. Pat. Nos.: 1,403,446; 1,875,067; 1,421,239; and 1,400,010. The wheel structures described in these patents have deflecting flaps which offer considerable resistance to air and therefor can become loose at high speeds.

SUMMARY OF THE INVENTION

The invention consists essentially of a circular member having an inner surface conforming to the outside of a tire and fitting thereon and shaped flexible rods extending therefrom with tips turned toward the road surface.

The main object of the invention is to provide a practical inexpensive yet sturdy and durable attachment of this type.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Figure 1:
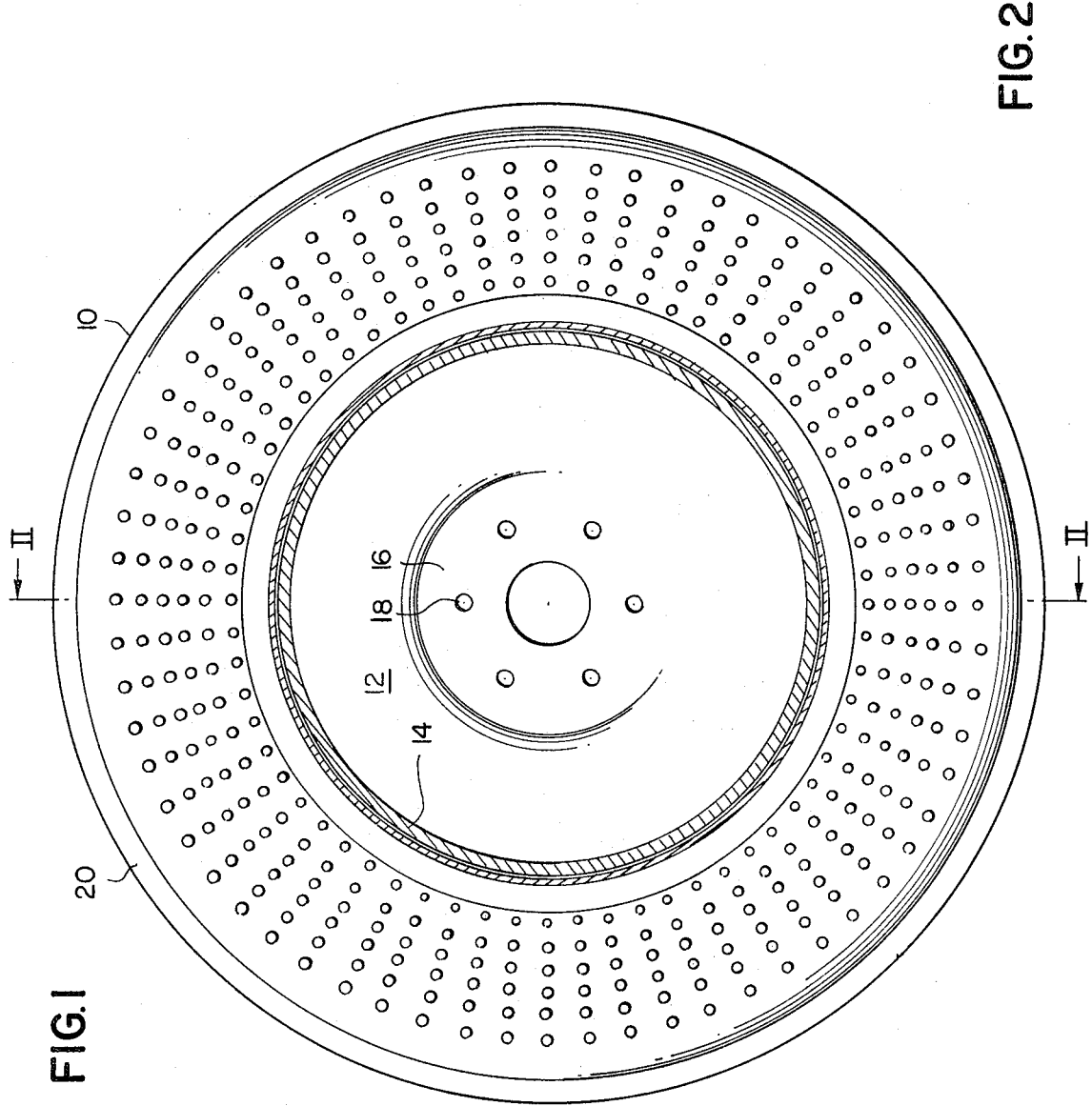

In the accompanying drawing, in which is shown one of the various possible illustrative embodiments of this invention, wherein like reference character identify the same or like parts:

FIG. 1 is a side elevation of a tire fitted with the attachment of the invention; and FIG. 2 is cross-sectional view thereof through line 11—11 of FIG. 1.

Referring to the drawing in detail, 10 represents the tire, 12 the wheel, 14 its rim and 16 the wheel sleeve which is secured to the hub by bolts 18.

The attachment of the invention is generally designated by 20 and consists of a ring member 22 formed of plastic, metal or rubber with an inner surface which is generally convex so as to conform to the sidewall surface of tire 10. As shown on FIG. 2, the inner periphery of member 22 fits under the outer rim 14 with the tire and preferably has a curled end portion 24 extending below the tire so as to clamp the lower periphery 24 of the member between the rim and the tire. Extending out from ring member 22 and preferably integrally molded of rubber, plastic such as nylon therewith are six rows of spaced, flexible interceptor rods about 3 MM in diameter with ends or tips 26 turned away from the center of the attachment. The first row 28 is 25 – 30 MM from the base grooves 29 of the tire and gives with any inequalities in the road so as not to break on impact. The length of the rods in this first row is about 15 MM; the second row 30 MM; the third and fourth rows 32 and 34 have rods measuring about 50 MM in length from ring member 22 to the end of tip 26. The center rods together with ring member or cap 22 preferably should extend not less than 85 MM from the side wall of the tire, distance A in FIG. 2. The rods in the fifth row 36 measure 35 MM and in the 6th row 35–15 MM. The rows preferably are 4 MM apart so that the active surface or "broom" of the attachment is about 42 MM wide.

All the above figures apply to a tire size 165-SR-14. For larger sizes, the broom surface should be made wider to improve performance.

Studies have shown that contact between a vehicle moving at about 15–20 MPH and water at a depth of 20 MM on road causes spray to be delivered at an angle of about 20° – 30° relative to the road surface. It is thus seen that when driving a car provided with the attachment of the invention, snow, water and mud splashed upwardly and outwardly will be deflected downwardly by the rods which as a result of the rotation of the wheel form a circular, rotary splash shield. The water, snow and mud will drop to the road without splashing on pedestrians or other cars thereby minimizing a possible accident cause-temporary blinding of the windshield of a trailing vehicle.

It will be seen from the foregoing that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention I claim as new and desire to secure by Letters Patent:

1. A splash guard for motor vehicles wheels comprising an annular member adapted to be secured on the side wall of a tire and having a shape conforming to the shape of said side wall; said member having an inner peripheral portion clamped between said tire and the rim of a wheel; and a plurality of spaced rows of flexible interceptor rods extending from said member; each of said rods having tips bent away from the center of said tire thereby forming a rotary, circular splash shield to downwardly deflect spray caused by contact between said wheels and wet roads.

2. The guard of claim 1, wherein six rows of rods are provided.

3. The guard of claim 2 wherein the rods of the two innermost rows increase progressively in length away from the center of said wheel, to two middle rows of rods of equal length; the two outermost rows having smaller rods.

4. The guard of claim 3 wherein said center rods extend at least 85 MM beyond the side wall of the tire.

5. The guard of claim 1 wherein said member and said rods consist of plastic.

6. The guard of claim 3, wherein the outermost row of rods extends to about 30 MM from the base groove of said tire.

* * * * *